(12) United States Patent
Schulz et al.

(10) Patent No.: US 11,598,467 B2
(45) Date of Patent: Mar. 7, 2023

(54) JOHNSTON COUPLING WITH GALVANIC SEPARATION

(71) Applicant: NEXANS, Courbevoie (FR)

(72) Inventors: Holger Schulz, Hannover (DE); Patrick Weber, Elze (DE)

(73) Assignee: NEXANS, Courbevoie (FR)

( * ) Notice: Subject to any disclaimer, the term of this patent is extended or adjusted under 35 U.S.C. 154(b) by 213 days.

(21) Appl. No.: 17/149,260

(22) Filed: Jan. 14, 2021

(65) Prior Publication Data

US 2021/0254771 A1   Aug. 19, 2021

(30) Foreign Application Priority Data

Jan. 20, 2020   (EP) ................................... 20305042

(51) Int. Cl.
  *F16L 39/00*   (2006.01)
  *F16L 25/02*   (2006.01)
  *F16L 59/14*   (2006.01)
  *F16L 59/18*   (2006.01)

(52) U.S. Cl.
  CPC .......... *F16L 39/005* (2013.01); *F16L 25/026* (2013.01); *F16L 59/141* (2013.01); *F16L 59/184* (2013.01); *F16L 2201/20* (2013.01)

(58) Field of Classification Search
  CPC ... F16L 59/141; F16L 59/065; F16L 2201/20; F16L 25/026; F16L 59/182
  See application file for complete search history.

(56) References Cited

U.S. PATENT DOCUMENTS

| | | | | |
|---|---|---|---|---|
| 2,785,536 A | * | 3/1957 | Hinckley | F16L 59/141 |
| | | | | 285/119 |
| 2,980,448 A | * | 4/1961 | Holben | F16L 59/141 |
| | | | | 62/50.7 |
| 3,137,143 A | * | 6/1964 | Richards | F16L 59/065 |
| | | | | 62/50.7 |
| 3,204,989 A | * | 9/1965 | Wilson | F16L 23/02 |
| | | | | 174/138 D |
| 3,207,533 A | * | 9/1965 | Richards | F16L 39/005 |
| | | | | 285/31 |
| 4,014,369 A | * | 3/1977 | Kobres, Jr. | F16L 59/06 |
| | | | | 138/112 |
| 5,139,288 A | | 8/1992 | Najm et al. | |
| 5,184,850 A | * | 2/1993 | Wermelinger | B29C 66/52298 |
| | | | | 285/21.2 |
| 8,267,433 B2 | * | 9/2012 | Lange | F16L 59/182 |
| | | | | 62/50.7 |

* cited by examiner

*Primary Examiner* — Zachary T Dragicevich
*Assistant Examiner* — James A Linford
(74) *Attorney, Agent, or Firm* — Sofer & Haroun, LLP

(57) ABSTRACT

A plug-in coupling has a coupling plug and a coupling socket. The coupling plug has an inner and an outer pipe piece and a first attachment flange and is connected to the first cryogenic line. The coupling socket has an inner and an outer pipe piece and a second attachment flange and is connected to the second cryogenic line. A circular annular seal on the distal end of the coupling plug is of electrically insulating form. An insulating sleeve is arranged on the outer pipe piece of the coupling plug. An insulating disc is situated between the first and the second attachment flange when the coupling plug has been inserted into the coupling socket. The plug-in coupling realizes a galvanic is separation between the coupling plug and the coupling socket.

5 Claims, 3 Drawing Sheets

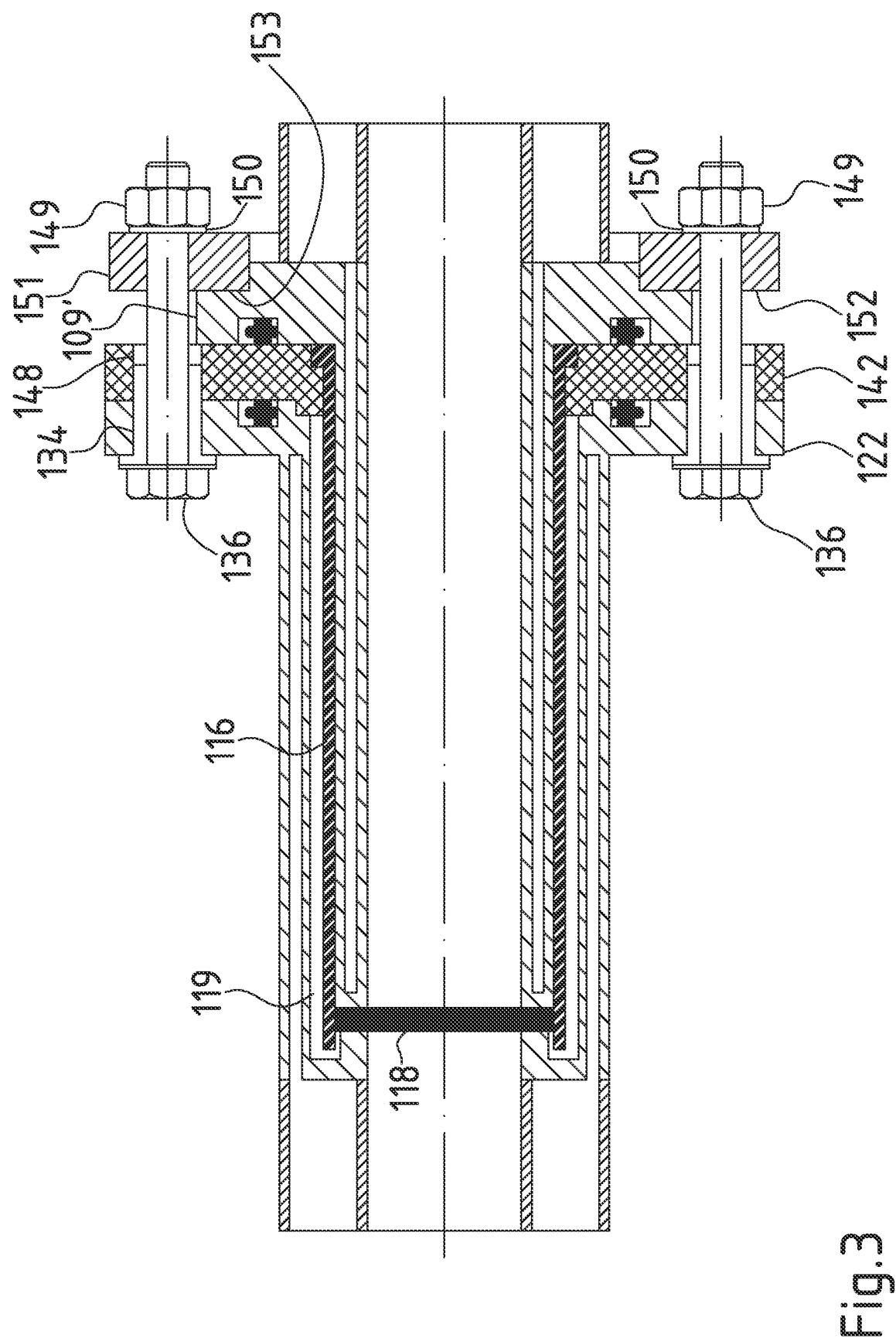

JOHNSTON COUPLING WITH GALVANIC SEPARATION

RELATED APPLICATION

This application claims the benefit of priority from European Patent Application No. EP 20 305 042.2, filed on Jan. 20, 2020, the entirety of which is incorporated by reference.

FIELD

The invention relates to a plug-in coupling for vacuum-insulated flexible lines, which is also known by the term "Johnston coupling". In particular, the invention relates to a Johnston coupling with galvanic separation.

BACKGROUND

Supercooled media, also referred to as cryogenic liquids, are commonly transported on ships, in tanker wagons or on tanker trucks. One important example of these is liquid natural gas (LNG), which has an evaporation temperature of −162° C. (111 K). Loading is typically performed using non-insulated lines and couplings, which ice up is during the loading process. The lack of thermal insulation leads to the evaporation of a proportion of the supercooled medium, which is associated with an energy loss because the evaporated medium must be liquefied again at some other location with great expenditure of energy.

In the case of the loading of even colder media, for example liquid hydrogen (evaporation temperature −253° C., 20 K) or liquid helium (evaporation temperature −269° C., 4 K), the oxygen in the ambient air, the evaporation temperature of which is relatively high (−183° C.; 90 K), would condense on the surface of non-insulated lines and couplings. This is extremely undesirable because a potential fire hazard is greatly increased by liquid oxygen.

Furthermore, for the transport of such cryogenic liquids or media, vacuum-insulated lines are also known which are produced for example by the company Nexans. For tank filling and loading purposes, the vacuum-insulated lines must be of flexible form and equipped at one end with a so-called Johnston coupling, by means of which two cryogenic lines are connectable without the thermal insulation being lost at the connecting point. In this way, icing of the coupling point and losses of the cryogenic medium as a result of evaporation are reduced.

In simple terms, in the case of a Johnston coupling, two double-walled vacuum-insulated pipelines are plugged one inside the other. The inner diameters of such pipelines are typically between 20 mm and 150 mm. Smaller or larger inner diameters are however basically also possible. The male part (inner double-walled pipeline) is plugged into the female part (outer double-walled pipeline). These are also referred to as coupling plug and coupling socket. In this way, the outer surface is thermally insulated with respect to the inner media-conducting pipe in a highly effective manner. For this purpose, the two double-walled pipelines must be plugged one inside the other over a predetermined length. Depending on the medium and desired thermal insulation, typical pipe-in-pipe lengths lie in the range of 200 mm to 600 mm. Deviations towards smaller or greater lengths are possible in individual applications.

Pipe connections which interconnect two objects which are at different electrical potential have a galvanic separation in order to electrically insulate the two objects with respect to one another. For example, there is always a voltage difference between a ship and a quay at which the ship is moored. This voltage difference is generated for example owing to a cathodic protection system of a ship or owing to galvanically generated voltages.

The stated voltage difference may lead to the generation of ignition sources, which constitute a major hazard source in particular during the loading or unloading of combustible products. Such ignition sources can be avoided for example by means of an electrical connection between the ship and the quay. In practice, it has however been found that the currents flowing in the electrical connection can lead to inadmissible warming of the electrical connection.

To avoid these problems, regulations have been established according to which the ship and a facility on land or on a quay should remain electrically separated. For oil tanker ships and terminals, it is for example stipulated that the ship and the on-shore structure are electrically separated from one another. For this purpose, an insulating flange is incorporated into the transport lines between ship and land. Such an insulating flange is known for example from EP 0 113 948 A1, which proposes a coupling body composed of an insulating material, which is connected on both sides by means of annular flanges to a pipeline which, on one side, leads to the ship and, on the other side, leads to an on-land facility. The pipeline is formed as a non-insulated pipeline.

Such non-insulated pipelines function effectively for the transport of liquids which are liquid at room temperature, but not for supercooled media or cryogenic liquids which necessitate vacuum-insulated lines and couplings for the reasons stated in the introduction.

Taking this as a starting point, it is the object of the present invention to create a plug-in coupling for cryogenic lines with a galvanic separation in order to overcome or at least alleviate one or more of the problems stated in the introduction.

SUMMARY OF THE INVENTION

To achieve this object, the invention proposes, according to a first aspect, a plug-in coupling for connecting a first to a second double-walled vacuum-insulated cryogenic line. The plug-in coupling comprises a coupling plug and a coupling socket. The coupling plug has an inner and an outer pipe piece and a first attachment flange and is connected to the first cryogenic line. The coupling socket has an inner and an outer pipe piece and a second attachment flange and is connected to the second cryogenic line. On a distal end of the coupling plug, there is arranged a circular annular seal such that a sealed connection between the coupling socket and the coupling plug is formed is when the coupling plug has been fully inserted into the coupling socket. The plug-in coupling according to the invention is characterized
 in that the seal on the distal end of the coupling plug is of electrically insulating form,
 in that an insulating sleeve is arranged on the outer pipe piece of the coupling plug, and
 in that an insulating disc is situated between the first and the second attachment flange when the coupling plug has been inserted into the coupling socket.

The proposed plug-in coupling offers a solution for, on the one hand, transporting supercooled media by means of a vacuum-insulated line, which is advantageous with regard to energy losses resulting from evaporation of the transported medium. At the same time, the proposed plug-in coupling allows electrical separation between the coupling parts, which is desired or imperatively stipulated for example in the case of the loading of ships.

In one refinement of the plug-in coupling according to the invention, in the first and the second attachment flange, there are provided through-holes for screws for the connection of the first to the second attachment flange, into which through-holes there are inserted insulating bushings which electrically insulate the screws with respect to the first and/or second attachment flange.

In a preferred embodiment of the plug-in coupling, the outer diameter of the first attachment flange is smaller than the outer diameter of the second attachment flange. A rotatable rotary flange with through-holes for screws lies on the first attachment flange, which rotary flange can be brought into a rotational position in which the through-holes of the rotary flange are aligned with the through-holes in the second attachment flange.

In this exemplary embodiment, it is not necessary to rotate the coupling plug in the coupling socket in order to achieve that through-holes for fastening screws in the coupling plug and in the coupling socket respectively are aligned with one another. The handling during the closure of the plug-in coupling is considerably simplified, because the double-walled vacuum-insulated cryogenic lines may have a considerable weight and are not easy to move.

In one advantageous refinement of the plug-in coupling, a seal is arranged is between the insulating disc and the second attachment flange and/or between the insulating disc and the first attachment flange. This/these additional seal(s) has/have the task of sealing off the plug-in coupling in the warm region in the event that the seal at the distal end of the coupling plug does not correctly seal off the plug-in coupling owing to the locally prevailing low temperatures. The additional seals ensure that, even in this adverse situation, there is no possibility of escape of evaporated medium, which under some circumstances can constitute an explosion risk.

In one modification of the plug-in coupling, the insulating disc and the insulating sleeve are formed as a unipartite single part. In this way, fewer parts have to be assembled during the assembly of the coupling plug.

According to a second aspect of the invention, a loading facility for cryogenic fluids having a plug-in coupling according to the first aspect of the invention is proposed.

Said loading facility realizes the advantages that have already been described in conjunction with the plug-in coupling with regard to the loading of supercooled media between a ship and an on-land facility.

BRIEF DESCRIPTION OF THE DRAWING

The invention will be discussed in more detail below by way of example on the basis of two exemplary embodiments and with reference to the accompanying figures. All the figures are purely schematic and not to scale. In the figures:

FIG. 3 shows a further exemplary embodiment of a Johnston coupling with galvanic separation in the assembled state.

Identical or similar elements are provided with identical or similar reference designations in the figures.

EXEMPLARY EMBODIMENT

Figure 1:
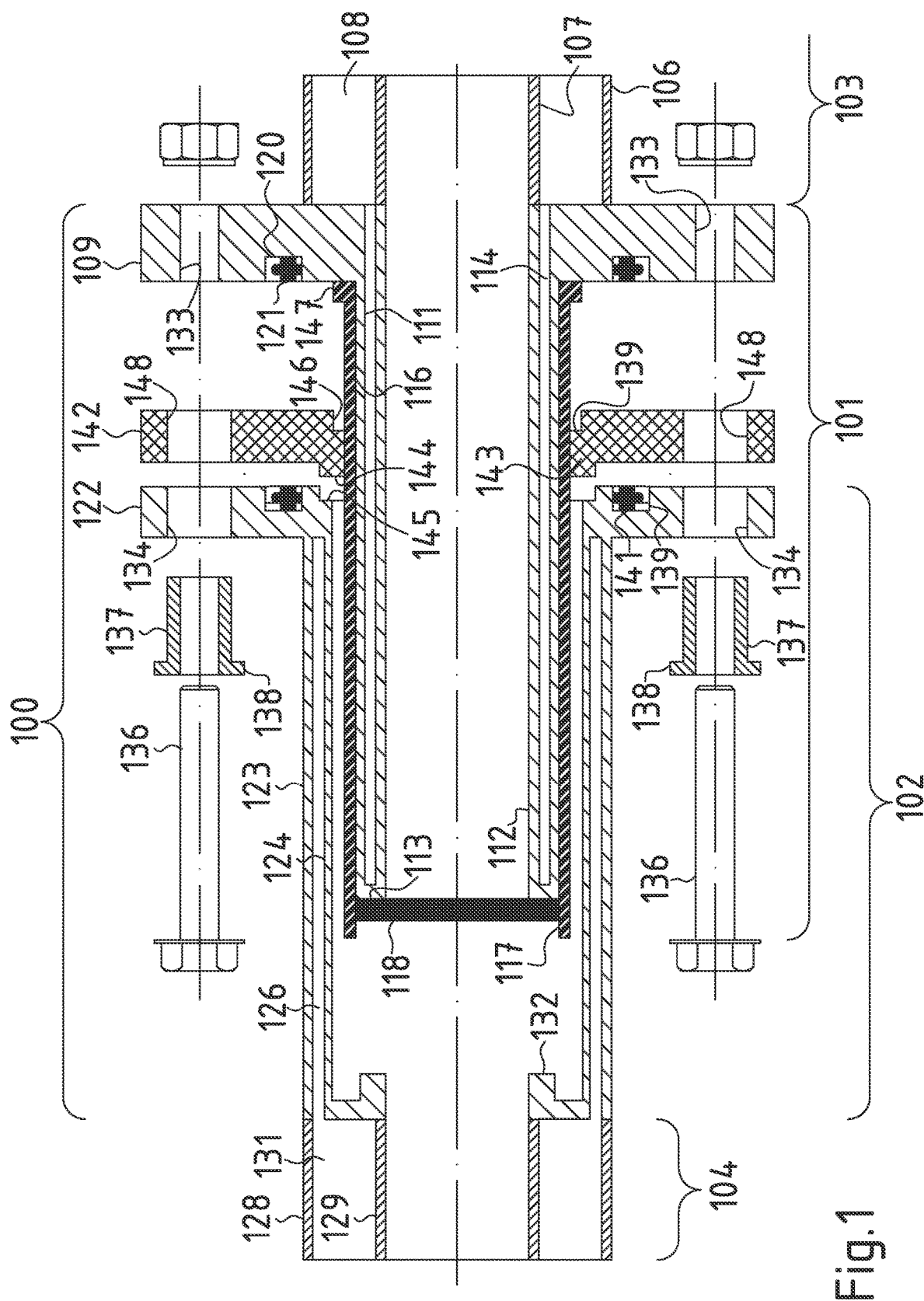
FIG. 1 is a schematic exploded illustration of a Johnston coupling with galvanic separation.

FIG. 1 shows a plug-in coupling which is denoted as a whole by the reference designation 100. The plug-in coupling 100 includes a coupling plug 101 and a coupling socket 102, which in FIG. 1 are illustrated prior to assembly and with a small spacing is to one another.

The coupling plug 101 is connected to a first cryogenic line 103, and the coupling socket 102 is connected to a second cryogenic line 104. The first cryogenic line 103 has an outer pipe 106 and an inner pipe 107 which are separated from one another by an intermediate space 108 and are thermally insulated with respect to one another by an insulating vacuum in the intermediate space 108. The cryogenic lines 103, 104 are double-walled vacuum-insulated cryogenic lines.

The coupling plug 101 comprises a first attachment flange 109, an outer pipe piece 111 and an inner pipe piece 112. The outer pipe 106 of the first cryogenic line 103 is welded to a first main surface of the first attachment flange 109. On the opposite main surface of the attachment flange 109, the outer pipe piece 111 is welded to the first attachment flange 109. A distal end 113, which is remote from the first attachment flange, of the outer pipe piece 111 is connected to the inner pipe piece 112, which extends to the first attachment flange and which is connected to the inner pipe 107 of the first cryogenic line 103. An annular gap 114 is formed between the outer pipe piece 111 and the inner pipe piece 112. The intermediate space 108 is connected in terms of flow to the annular gap 114, such that the insulating vacuum extends into the annular gap 114 and ensures good thermal insulation of the inner pipe piece 112.

An electrically insulating sleeve 116 is fitted onto the outer pipe piece 111 of the coupling plug 101. The sleeve 116 is somewhat longer than the outer pipe piece 111 and thus protrudes at the distal end 113 of the coupling plug 101 and forms a protruding edge 117 which holds a circular annular seal 118, which bears against the distal end 113 of the coupling plug 101. The seal 118 is produced from an electrically insulating material, for example from polytetrafluoroethylene (PTFE) or Torlon®. Cut into the first attachment flange 109 is an annular groove 120 into which a seal 121 is inserted. The seal 121 may be of electrically conductive or electrically non-conductive form.

The coupling socket 102 has a second attachment flange 122, an outer pipe piece 123 and an inner pipe piece 124. The pipe pieces 123, 124 are welded in each case by means of one end to the second attachment flange 122, wherein, in turn, an annular gap 126 is formed between the pipe pieces 123, 124. The respective other ends of the pipe pieces 123, 124 are connected to the second cryogenic line 104. The second cryogenic line has an outer pipe 128 and an inner pipe 129. Between the outer pipe 128 is and the inner pipe 129, there is formed an intermediate space 130 in which an insulating vacuum prevails which thermally insulates the inner pipe 129. The outer pipe 128 of the second cryogenic line 104 is connected to the outer pipe piece 123, and the inner pipe 129 is connected to the inner pipe piece 124, of the coupling socket 102, such that the intermediate space 130 is connected in terms of flow to the annular gap 126, and the insulating vacuum extends into the annular gap 126 of the coupling socket 102 and ensures good thermal insulation of the inner pipe piece 124 of the coupling socket 102. The outer diameter of the insulating sleeve 116 is smaller than the inner diameter of the inner pipe piece of the coupling socket, such that an annular gap 131 (FIG. 2) is formed between the sleeve 116 and the inner pipe piece 124.

Figure 2:
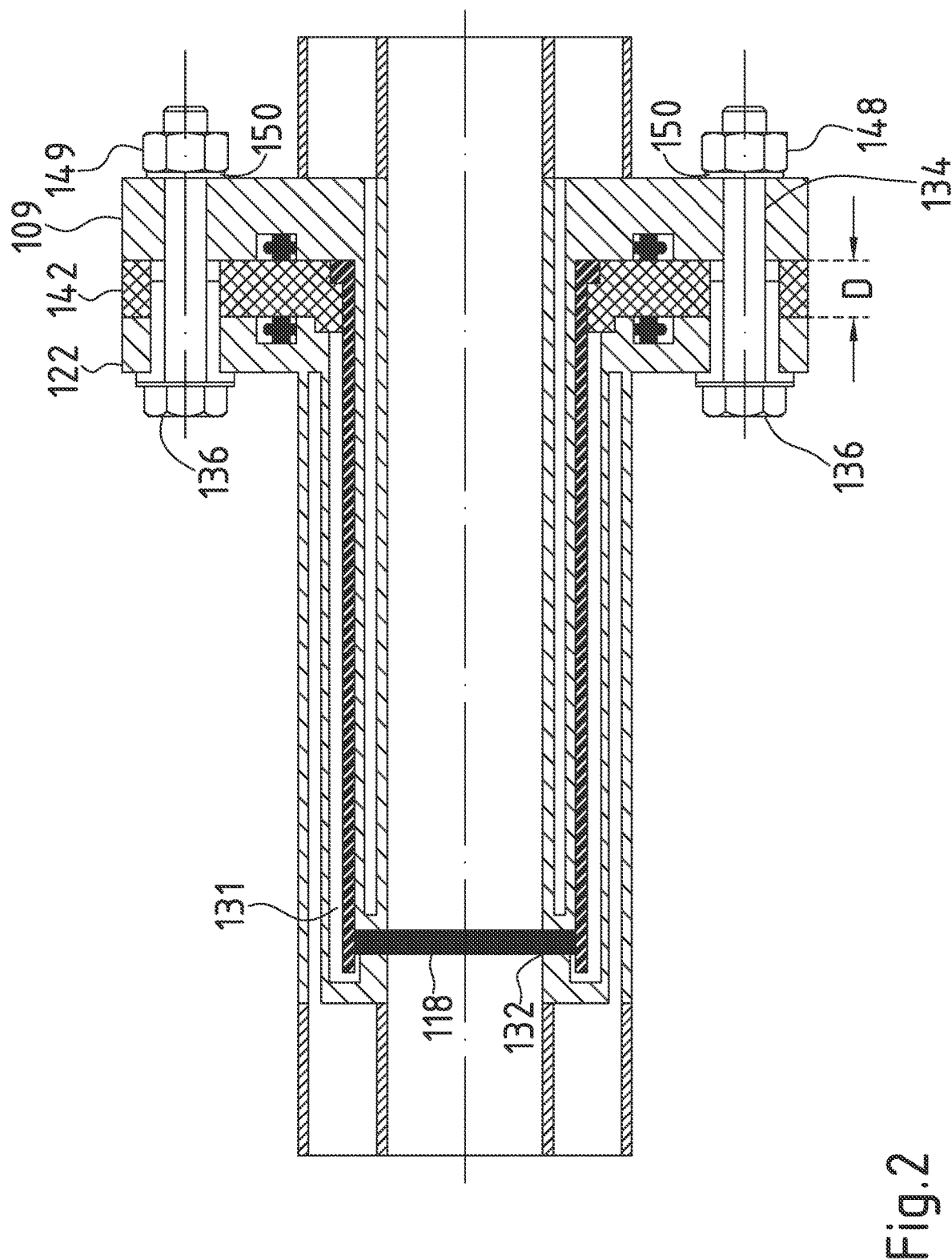
FIG. 2 shows the Johnston coupling from FIG. 1 after assembly.

At the transition between the coupling socket 102 and the second cryogenic line 104, there is formed an annular seat 132 for the seal 118, which bears against the seat 132 when the coupling plug 101 has been fully inserted into the coupling socket 102 (FIG. 2).

At the outside in a radial direction, the first and the second attachment flange 109, 122 have through-holes 133, 134 for fastening screws 136. The through-holes 134 have a diameter which is greater than the diameter of the fastening screws 136 in order to allow the installation of insulating bushings 137 which, in the assembled state, bear with a collar 138 against the second attachment flange 122. Cut into the second attachment flange 122 is an annular groove 139 into which a seal 141 is inserted. The seal 141 may be of electrically conductive or electrically non-conductive form.

Between the first and the second attachment flange 109, 122, there is arranged an insulating disc 142 which has a central opening 143 through which the insulating sleeve 116 projects.

The insulating disc 142 has, on the side facing towards the second attachment flange 122, an annular projection 144 which fits exactly into an annular recess 145 in the second attachment flange 122 and serves for centring the insulating disc 142. On its opposite side, there is provided in the insulating disc 142 an annular recess 146 which, in the assembled state of the plug-in coupling, receives an encircling collar 147 of the insulating sleeve 116. The annular projections and recesses ensure centring of the individual components with respect to one another. The insulating disc 142 furthermore has through-holes 148 for the fastening screws 136, which through-holes are arranged at the same angular positions as the through-holes 133, 134 in the first and second attachment flange 109, 122 respectively in order to allow the installation of the fastening screws 136 when the insulating disc 142 and the first and second attachment flange 109, 122 respectively have been rotated into a corresponding rotational position.

FIG. 2 shows the plug-in coupling 100 from FIG. 1 in an assembled state. The fastening screws 136 are installed with the aid of threaded nuts 149 and washers 150 and press the first and second attachment flanges 109, 122 against the insulating disc 142 from both sides. Here, the thickness D of the insulating disc 142 is dimensioned such that the distal end 113 of the coupling plug 101 presses the seal 118 onto the seat 132 of the coupling socket 102. Here, the seal 118 seals off the transition between the coupling plug 101 and the coupling socket 102. Since the seal 118 is in contact with supercooled media during the operation of the plug-in coupling, 100 percent leak-tightness is not ensured under some circumstances. If supercooled medium passes the seal 118 and enters the annular gap 131 between the insulating sleeve 116 and the inner pipe 124 of the coupling socket 102 and evaporates there, then the seals 121, 141, which are arranged in the warm region of the first and second attachment flange 109, 122 respectively, prevent evaporated medium from escaping from the plug-in coupling into the environment. In the case of combustible media such as liquid natural gas or liquid hydrogen, such an escape is extremely undesirable.

As can be seen from FIG. 2, there is no metallic connection between the coupling plug 101 and the coupling socket 102. The electrically insulating seal 118, the electrically insulating sleeve 116 and the insulating disc 142 prevent metal parts of the coupling plug 101 and of the coupling socket 102 from making contact. This is the case even if the coupling plug 101 is inserted obliquely or in a misaligned manner into the coupling socket. The electrically insulating sleeve 116 prevents metal parts of the coupling plug 101 from coming into contact with the inner pipe piece 124 of the coupling socket 102. The fastening screws 136 are guided in the electrically insulating sleeves 137 and likewise produce no electrical contact between the coupling plug 101 and the coupling socket 102. In this way, a galvanic separation between the coupling plug 101 and the coupling socket 102 is attained.

During the assembly of the plug-in coupling, it is firstly the case that the coupling plug is plugged into the coupling socket. Then, the insulating disc 142 is rotated until the through-holes 148 in the insulating disc 142 are aligned with the through-holes 134 in the second attachment flange 122. This rotational position of the insulating disc 142 is fixed by means of one or more partially plugged-in fastening screws 136. Then, the coupling plug 101 is rotated until the fastening screws 136 can also be plugged through the through-holes 133 in the first attachment flange 109 and can be fixed by means of the threaded nuts 149.

The insulating disc 142 can be rotated relatively easily, but the plug-in coupling 101 commonly cannot, because the plug-in coupling is fixedly connected to the first cryogenic line 103. Therefore, a further exemplary embodiment is proposed in which the plug-in coupling 100 is easier to close.

FIG. 3 shows a second exemplary embodiment of the plug-in coupling 100 according to the invention, which differs from the plug-in coupling as per FIG. 2 in particular in that the first attachment flange 109' is not pressed directly against the insulating disc 142 or the second fastening flange 122 by means of the fastening screws, but rather the tensioning force of the fastening screws 136 is exerted on a rotatable rotary flange 151, which lies against the first attachment flange 109' and which thus transmits the force exerted by the fastening screws 136 to the first attachment flange 109'. For this purpose, the outer diameter of the attachment flange 109' is reduced to such an extent that the fastening screws 136 extend past an outer circumference of the first attachment flange 109'. The rotary flange 151 is formed as a circular annular disc which has through-holes 152 for the fastening screws 136. The through-holes 152 are arranged concentrically with respect to the through-holes 134 in the second attachment flange 122. The rotary flange 151 is received in a seat 153 on the first attachment flange 109' with a small degree of play, such that the rotary flange 151 can be easily rotated on the first attachment flange 109' into a rotational position in which the through-holes 152 are aligned with the through-holes 134 in the second attachment flange 122, such that the fastening screws 136 can be installed. In this exemplary embodiment, it is not necessary for the coupling plug 101 to be rotated after being inserted into the coupling socket 102. It suffices to rotate the rotary flange 151, which makes the work of the personnel producing the plug-in coupling connection considerably easier.

In a modification of the second exemplary embodiment which is not illustrated in the figures, the roles of the first and the second attachment flange are, as it were, reversed, in the sense that a rotary flange lies on the second attachment flange. In this modified second exemplary embodiment, the outer diameter of the second attachment flange is smaller, such that the fastening screws 136 extend past the outer circumference of the second attachment flange. In this way, it is achieved again that, during the assembly of the plug-in coupling, only the easily rotatable rotary flange has to be brought into a rotational position in order that the through-holes in the rotary flange are aligned with the through-holes in the first attachment flange and the fastening screws can be installed. In the case of this modified embodiment, the insulating bushings 137 are arranged in the first attachment flange 109.

In a further modification of the first or second exemplary embodiment, the insulating sleeve 116 and the insulating disc 142 are formed as a unipartite single part, whereby the number of individual parts of the plug-in coupling 100 is reduced. The single part may also have advantages in the context of the assembly of the plug-in coupling.

LIST OF REFERENCE DESIGNATIONS

100 Plug-in coupling
101 Coupling plug
102 Coupling socket
103 First cryogenic line
104 Second cryogenic line
106 Outer pipe
107 Inner pipe
108 Intermediate space
109, First attachment flange
109'
111 Outer pipe piece
112 Inner pipe piece
113 Distal end
114 Annular gap
116 Insulating sleeve
117 Protruding edge
118 Seal
120 Annular groove
121 Seal
122 Second attachment flange
123 Outer pipe piece
124 Inner pipe piece
126 Annular gap
128 Outer pipe
129 Inner pipe
131 Intermediate space
132 Annular seat
133 Through-hole
134 Through-hole
136 Fastening screw
137 Insulating bushings
138 Collar on the insulating bushing
139 Annular groove
141 Seal
142 Insulating disc
143 Central opening
144 Annular projection
145 Annular recess
146 Annular recess
147 Encircling collar
148 Through-hole
149 Threaded nut
150 Washer
151 Rotary flange
152 Through-holes
153 Seat

The invention claimed is:

1. A plug-in coupling for connecting a first to a second double-walled, vacuum-insulated cryogenic line, wherein the plug-in coupling comprises:
   a coupling plug and a coupling socket,
   wherein the coupling plug has an inner and an outer pipe piece and a first attachment flange and is connected to the first cryogenic line,
   wherein the coupling socket has an inner and an outer pipe piece and a second attachment flange and is connected to the second cryogenic line,
   wherein, on a distal end of the coupling plug, there is arranged a circular annular seal such that a sealed connection between the coupling socket and the coupling plug is formed when the coupling plug has been fully inserted into the coupling socket,
   wherein the circular annular seal on the distal end of the coupling plug is of electrically insulating form, in that an insulating sleeve is arranged on the outer pipe piece of the coupling plug, and in that an insulating disc is situated between the first and the second attachment flange when the coupling plug has been inserted into the coupling socket.

2. The plug-in coupling according to claim 1, wherein, in the first and the second attachment flange, there are provided through-holes for screws for the connection of the first to the second attachment flange, and, into the through-holes, there are inserted insulating bushings which electrically insulate the screws with respect to the first and/or second attachment flange.

3. The plug-in coupling according to claim 1, wherein the outer diameter of the first attachment flange is smaller than the outer diameter of the second attachment flange, in that a rotatable rotary flange with through-holes for screws lies on the first attachment flange, which rotary flange can be brought into a rotational position in which the through-holes of the rotary flange are aligned with the through-holes in the second attachment flange.

4. The plug-in coupling according to claim 1, wherein a seal is arranged between the insulating disc and the first attachment flange and/or between the insulating disc and the second attachment flange.

5. The plug-in coupling according to claim 1, wherein the insulating disc and the insulating sleeve are formed as a unipartite single part.

* * * * *